United States Patent [19]

Shepherd et al.

[11] Patent Number: 5,249,920
[45] Date of Patent: Oct. 5, 1993

[54] TURBINE NOZZLE SEAL ARRANGEMENT

[75] Inventors: Andrew Shepherd; Richard W. Albrecht, both of Fairfield; Robert J. Corsmeier, Cincinnati, all of Ohio

[73] Assignee: General Electric Company, Cincinnati, Ohio

[21] Appl. No.: 911,237

[22] Filed: Jul. 9, 1992

[51] Int. Cl.5 .............................. F01D 25/24
[52] U.S. Cl. .................................. 415/134; 415/135
[58] Field of Search .......................... 415/134–139

[56] References Cited

U.S. PATENT DOCUMENTS

| | | | |
|---|---|---|---|
| 4,184,689 | 1/1980 | Brodell et al. | 415/134 |
| 4,537,024 | 8/1985 | Grosjean | 415/139 |
| 4,566,851 | 1/1986 | Comeau et al. | 415/139 |
| 4,632,634 | 12/1986 | Vinciguerra et al. | 415/139 |
| 4,642,024 | 2/1987 | Weidner | 415/115 |
| 4,815,933 | 3/1989 | Hansel et al. | 415/189 |
| 4,883,405 | 11/1989 | Walker | 415/137 |
| 5,092,735 | 3/1992 | Katy et al. | 415/115 |
| 5,118,120 | 6/1992 | Drerup et al. | 415/115 |
| 5,149,250 | 9/1992 | Plemmons et al. | 415/209.3 |
| 5,154,577 | 10/1992 | Kellock et al. | 415/134 |

FOREIGN PATENT DOCUMENTS

| | | | |
|---|---|---|---|
| 3413304 | 10/1985 | Fed. Rep. of Germany | 415/137 |
| 147194 | 10/1961 | U.S.S.R. | 415/138 |
| 853997 | 11/1960 | United Kingdom | 415/138 |

*Primary Examiner*—John T. Kwon
*Attorney, Agent, or Firm*—Jerome C. Squillaro

[57] ABSTRACT

A nozzle seal arrangement, for a turbine nozzle of a gas turbine engine, which impedes leakage of high pressure cooling air past the nozzle inner bands into the flow path to the outside thereof. The nozzle seal arrangement includes an annular nozzle support flange attached to and extending along the stationary support structure adjacent to the nozzle, a band flange attached to and extending along the inner band of each nozzle segment and disposed adjacent to the support flange, a continuous seal member having a W-shaped configuration in cross-section which extends circumferentially about the central axis, and an annular recess defined in the forward face of the nozzle support flange which extends circumferentially about the central axis and receives and seats the seal member at the aft side thereof.

5 Claims, 3 Drawing Sheets

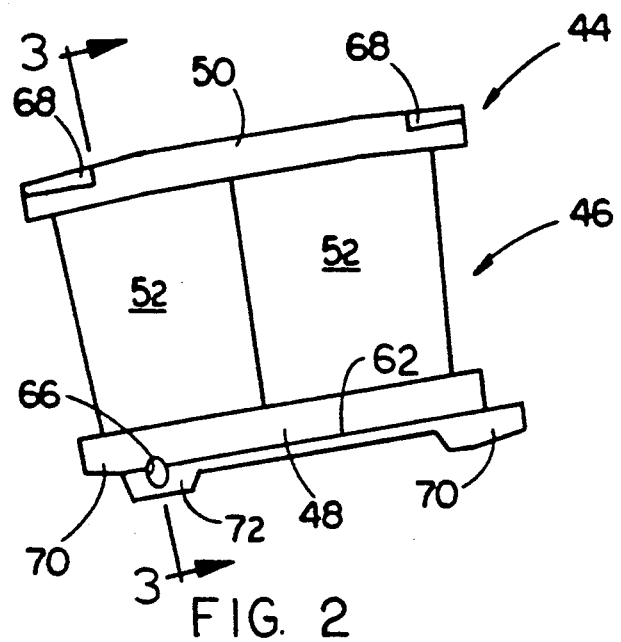
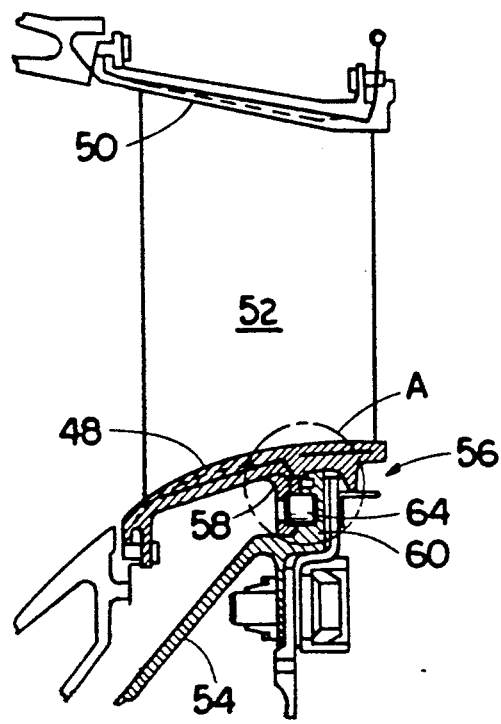
FIG. 2
FIG. 3

TURBINE NOZZLE SEAL ARRANGEMENT

CROSS REFERENCE TO RELATED APPLICATIONS

Reference is hereby made to the following copending U.S. patent applications dealing with related subject matter and assigned to the assignee of the present invention:

1. "Mounting Arrangements For Turbine Nozzles" by Victor H. S. Correia et al, assigned U.S. Ser. No. 766,297 and filed Sep. 27, 1991. (13DV-10823)
2. "Turbine Nozzle Support Arrangement" by Andrew Shepherd et al, assigned U.S. Ser. No. 07/911,235 and filed Jul. 9, 1992. (13DV-11416)

BACKGROUND OF THE INVENTION

1. Field of the Invention

The present invention relates generally to gas turbine engines and, more particularly, to a turbine nozzle seal arrangement.

2. Description of the Prior Art

Gas turbine engines typically include a core engine having a compressor for compressing air entering the core engine, a combustor where fuel is mixed with the compressed air and then burned to create a high energy gas stream, and a first or high pressure turbine which extracts energy from the gas stream to drive the compressor. In aircraft turbofan engines, a second turbine or low pressure turbine located downstream from the core engine extracts more energy from the gas stream for driving a fan. The fan provides the main propulsive thrust generated by the engine.

An annular high pressure nozzle is located between the combustor and high pressure turbine and between stages of the turbine. The annular nozzle includes a pair of radially spaced inner and outer annular bands disposed concentrically about a longitudinal axis of the core engine and a plurality of airfoils supported between the inner and outer annular bands. The airfoils are arranged in circumferentially spaced relation from one another and extend in radial relation to the core engine axis. Either the inner band or the outer band may include some form of flange for coupling the nozzle to a stationary engine support structure. The annular nozzle is provided by a plurality of arcuate segments which fit end-to-end together to form the 360° circumferentially extending nozzle. Each nozzle segment includes arcuate segments of the inner and outer bands and a pair of the airfoils mounted side-by-side between the inner and outer band segments The annular high pressure nozzle provides the function of directing and/or re-directing hot gas flow from the combustor into a more efficient direction for impinging on and effecting rotation of the rotor stages of the high pressure turbine. The directing process performed by the nozzle also accelerates gas flow resulting in a static pressure reduction between inlet and outlet planes and high pressure loading of the nozzle. Also, the annular nozzle experiences high thermal gradients from the hot combustion gases and the coolant air at the radial support surfaces.

In common nozzle support systems, the nozzle segments are attached by bolted joints or a combination of bolts and some form of clamping arrangement to an engine support structure. In some stages, such as the first stage nozzle, the nozzle segments are attached by bolted joints to the engine stationary support structure via a radially inner mount or flange structure coupled to the inner band segments. The radially outer band segments are not mechanically retained but are supported against axial forces by a circumferential engine flange. In other stages, such as stage 2 of an engine, the nozzle segments may be attached at their radially outer band segments but be free at its radially inner band segments.

In either design, the use of bolted joints and clamps at spaced circumferential locations about the segments of a nozzle band act as restrictions to free thermal expansion of the band. Due to the band being hotter than the support structure to which it is attached, or due to thermal gradients within the bands, radial or axial bowing of the band segments of the nozzle occurs which, in turn, produces leaking of gas flow from the flow path or leaking of cooling air into the flow path and stressing of bolts, support flanges and the airfoils attached to the band, leading to crack formation.

Alternative mounting arrangements have been proposed to eliminate the use of bolts and clamps. In one alternative nozzle mounting arrangement the segments of the nozzle are mounted on two pins per segment. The pins are retained in blind holes in the engine support structure. This design allows the nozzle segment to rock axially on the support structure via a chordal hinge defined in the flange of the nozzle segment. One of the two mounting pins per segment makes a tight fit in the nozzle flange to position the nozzle segment accurately in the tangential and radial directions. The other of the two mounting pins makes a loose fit in the nozzle flange. However, the axial rocking of the nozzle segment causes bending stress in the tight-fitting pin in the same way as a bolted joint described above. Pin wear is also a problem in this design.

In another alternative nozzle mounting arrangement, the nozzle segment is also allowed to rock axially on a chordal hinge. The nozzle segment is retained axially and tangentially by radially-extending bolts through the nozzle support structure. These radial bolts do not attach to the nozzle segment, but are retention features only. The nozzle segment is positioned in the engine by the gas loads which positively locate the nozzle segments axially against the nozzle support flange and tangentially against the radial bolts. While this arrangement allows the nozzle segment to rock axially without transmitting bending stress to the bolts or nozzle support structure, its main disadvantage is that leakage areas are created by the axial bowing of the nozzle segments due to thermal gradients.

In yet another alternative nozzle mounting arrangement proposed by the patent application cross-referenced above, interfitting hooks and studs and overlying projections and lands are provided on the outer band segments of adjacent nozzle segments and on adjacent portions of the support structure. These mounting features substantially overcome the disadvantages of bolted or clamped nozzles by providing a positive attachment between the nozzle and an adjacent engine support structure. However, a need still remains for development of alternative designs which will provide further improvements in mounting the nozzle segments to the engine support structure.

SUMMARY OF THE INVENTION

Turbine nozzle seal and support arrangements disclosed herein are designed to satisfy the aforementioned needs. The nozzle seal arrangement constitutes the subject matter of the present invention. The nozzle support arrangement constitutes the subject matter of the invention of the second application cross-referenced above. Both arrangements are disclosed herein in view that their respective advantages are complementary and reinforced when both arrangements are employed in the same nozzle. However, it should be understood that the nozzle support arrangement of the second cross-referenced application can be employed independently of the nozzle seal arrangement of the present invention.

Accordingly, the present invention is directed to the nozzle seal arrangement set forth in a gas turbine engine. The gas turbine engine has a longitudinal central axis, an annular casing disposed about the central axis and having an annular stationary support structure, an annular combustor for generating pressurized combustion gases, a high pressure turbine disposed rearwardly of the combustor for receiving the pressurized combustion gases and extracting energy from the gases, and an annular turbine nozzle having at least one stage disposed in the annular casing between the combustor and high pressure turbine. The annular nozzle stage includes a plurality of nozzle segments arranged in an end-to-end circumferential relationship about the central axis. Each nozzle segment has a pair of inner and outer bands spaced from one another in radial relation to the central axis and defining a flow path for pressurized combustion gases from the combustor to the high pressure turbine. Each nozzle segment also has at least one airfoil extending in radial relation to the central axis and mounted between the inner and outer bands across the flow path for the pressurized combustion gases.

The nozzle seal arrangement of the present invention for impeding leakage of high pressure cooling air past the nozzle inner bands into the flow path to the outside thereof comprises: (a) an annular nozzle support flange attached to and extending along the stationary support structure adjacent to the nozzle; (b) a band flange attached to and extending along the inner band of each nozzle segment and disposed adjacent to the support flange; (c) a continuous seal member having an inverted W-shaped configuration in crosssection which extends circumferentially about the central axis; and (d) an annular recess defined in the forward face of the nozzle support flange which extends circumferentially about the central axis and receives and seats the seal member at the aft side thereof. The forward side of the seal member extends past the forward face of the nozzle support flange and engages the aft face of the inner band flange. The seal member is flexible enough to accommodate any bowing of the nozzle support flange caused by thermal gradient from the aft to forward ends of the nozzle inner band. This W-shaped seal member also provides a second seal in series with the seal provided by the chordal hinge, reducing leakage even when no bowing occurs.

The nozzle seal arrangement also includes a plurality of L-shaped spline seal members arranged between the end faces of the nozzle segments. These seal members block the leakage path between the vertical and aft horizontal spline seal members which are also employed between the end faces of the nozzle segments.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an enlarged rear elevational view of a segment of a turbine nozzle employed in the engine of FIG. 1.

FIG. 3 is a tangential sectional view of the nozzle segment taken along line 3—3 of FIG. 2.

DETAILED DESCRIPTION OF THE INVENTION

Figure 1:
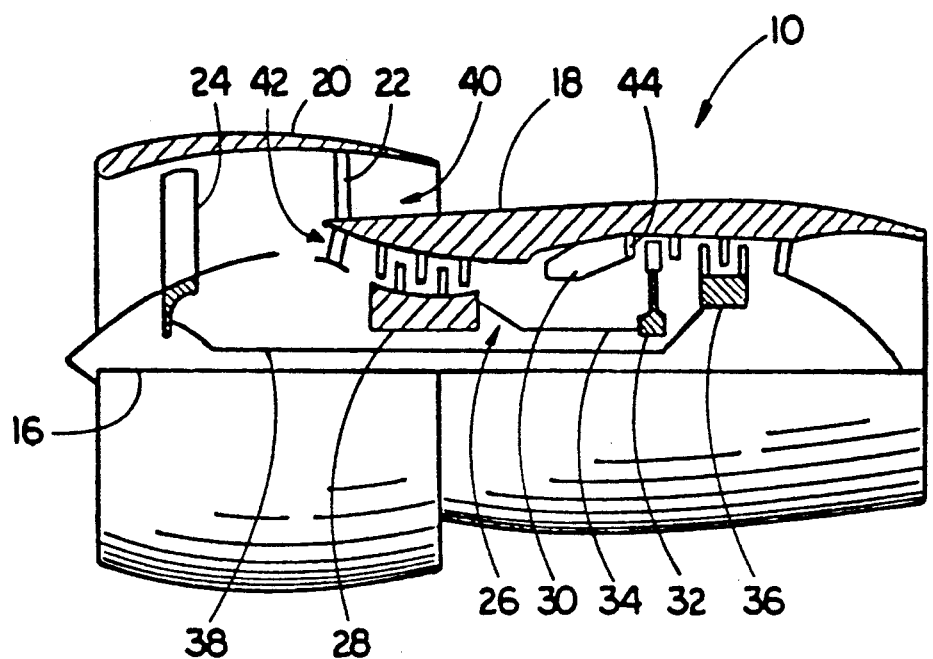
FIG. 1 is a schematic representation of a gas turbine engine to which can be applied a turbine nozzle seal arrangement of the present invention and a turbine nozzle support arrangement of the cross-referenced invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Gas Turbine Engine

Referring now to the drawings, and particularly to FIG. 1, there is schematically illustrated a gas turbine engine, generally designated 10, to which can be applied a turbine nozzle support arrangement of the cross-referenced invention and a turbine nozzle sealing arrangement 14 of the present invention. The engine 10 has a longitudinal central axis 16 and an outer stationary annular casing 18 and nacelle 20 disposed coaxially and concentrically about the axis 16. The nacelle 20 is supported about the forward end of the casing 18 by a plurality of struts 22, only one of which being shown in FIG. 1.

The gas turbine engine 10 includes a forward fan 24 disposed within the nacelle 20 and a core gas generator engine 26 disposed rearwardly of the fan 24 and within the stationary casing 18. The core engine 26 includes a multi-stage compressor 28, a combustor 30, and a high pressure turbine 32, either single or multiple stage, all arranged coaxially about the longitudinal central axis 16 of the gas turbine engine 10 in a serial, axial flow relationship. An annular outer drive shaft 34 fixedly interconnects the compressor 28 and high pressure turbine 32.

The gas turbine engine 10 further includes a low pressure turbine 36 disposed rearwardly of the high pressure turbine 32. The low pressure turbine 36 is fixedly attached to an inner drive shaft 38 which, in turn, is connected to the forward fan 24. Conventional bearings and the like have been omitted from FIG. 1 for the sake of clarity.

In operation, air enters the gas turbine engine 10 through an air inlet of the nacelle 20 surrounding the forward fan 24. The air is compressed by rotation of the fan 24 and thereafter is split between an outer annular passageway 40 defined between the nacelle 20 and the engine casing 18, and a core engine passageway 42 having its external boundary defined by the engine casing 18. The pressurized air entering the core engine passageway 42 is further pressurized by the compressor 28. Pressurized air from the compressor 28 is mixed with fuel in the combustor 30 and ignited, thereby generating combustion gases. Some work is extracted from these gases by the high pressure turbine 32 which drives the compressor 24. The remainder of the combustion gases are discharged from the core engine 26 into the low pressure turbine 36 to drive the forward fan 24. The portion of the air flow provided from the fan 24 through the outer passageway 40 produces the main propulsive thrust generated by the gas turbine engine 10.

Annular Turbine Nozzle

Referring to FIGS. 1–3, the gas turbine engine 10 also includes one or more annular high pressure turbine nozzles 44 located between the combustor 30 and high pressure turbine 32 and between stages of the high pressure turbine 32. Each annular nozzle 44 is formed by a plurality of arcuate segments 46 which fit end-to-end together to form the 360° circumferentially extending nozzle disposed concentrically about the longitudinal central axis 16 of the gas turbine engine 10. Each nozzle segment 46 includes a pair of arcuate portions of inner and outer bands 48, 50 in the nozzle 44 and a pair of airfoils 52 of the plurality thereof in the nozzle 44. The airfoils 52 are mounted side-by-side between the inner and outer bands 48, 50 and are arranged in circumferentially spaced relation from one another and extend in radial relation to the central axis 16 of the gas turbine engine 10. The nozzle segments 46 are coupled at either the inner band 48 or the outer band 50 to a stationary support structure 54 connected on the annular casing 18 of the gas turbine engine 10.

The annular turbine nozzle 44 provides the function of directing and/or re-directing hot gas flow from the combustor 30 into a more efficient direction for impinging on and effecting rotation of the rotor stages of the high pressure turbine 32. The directing process performed by the nozzle 44 also accelerates gas flow resulting in a static pressure reduction between inlet and outlet planes and high pressure gas loading of the airfoils 52 of the nozzle 44.

Turbine Nozzle Support Arrangement

Referring now to FIGS. 2–5, the nozzle segments 46 of the first stage of the nozzle 44 located between the combustor 30 and the high pressure turbine 32 are mounted to the stationary support structure 54 by the nozzle support arrangement of the cross-referenced invention, generally designated 56. The nozzle support arrangement 56 associated with each nozzle segment 46 includes a band flange 58 attached to and extending along the inner band 48, and a nozzle support flange 60 attached to and extending along the stationary support structure 54. As more clearly shown in FIG. 5, the inner band flange 58 has a chordal hinge 62 cut on its aft face which, as can be appreciated from FIGS. 2 and 5, allows the nozzle segment 46 to lean forward at the outer band 50 without allowing a leakage path to open between the inner band flange 58 and the flat face of the nozzle support flange 60. The chordal hinge 62 ensures that the contact area between the hotter nozzle segment 46 and the cooler nozzle support flange 60 is minimized.

Figure 5:
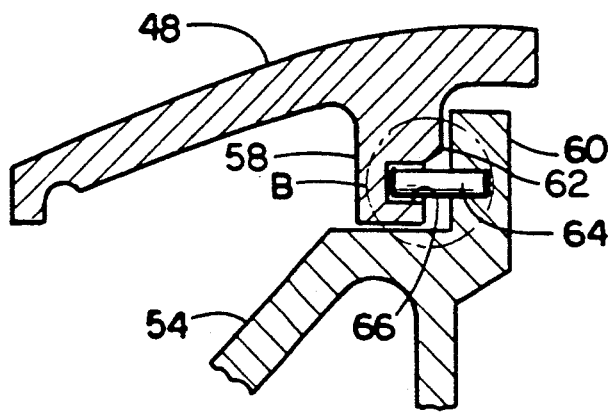
FIG. 5 is a schematic tangential sectional view of the nozzle support arrangement of the cross-referenced invention, showing the position of a pin relative to an oval-shaped hole when the engine is in a low power condition.
Figure 8:
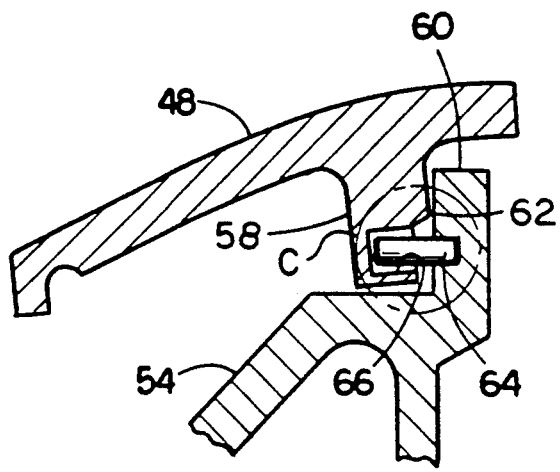
FIG. 8 is a schematic tangential sectional view of the nozzle support arrangement of the cross-referenced invention, showing the position of the pin relative to the oval-shaped hole when the engine is in a high power condition.
Figure 7:
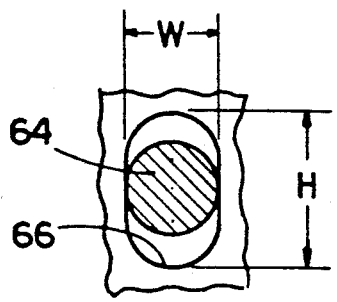
FIG. 7 is an enlarged sectional view taken along line 7—7 of FIG. 6.
Figure 6:
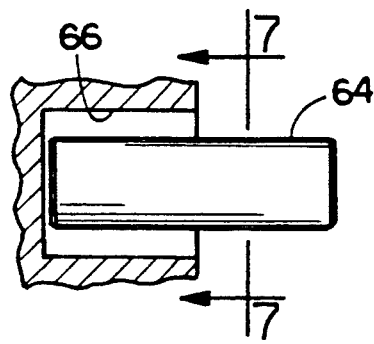
FIG. 6 is an enlarged view of area B of FIG. 5.
Figure 10:
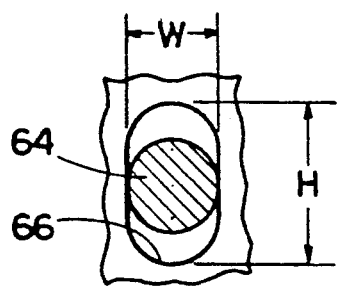
FIG. 10 is an enlarged sectional view taken along line 10—10 of FIG. 9.
Figure 9:
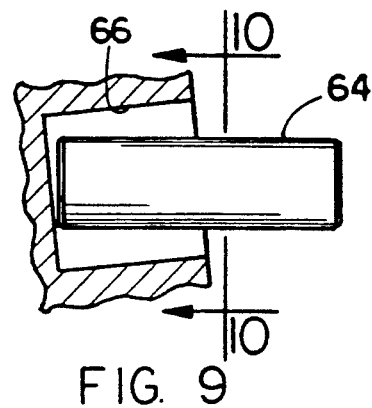
FIG. 9 is an enlarged view of area C of FIG. 8.

The nozzle support arrangement 56 associated with each nozzle segment 46 also includes a single mounting pin 64 having a generally cylindrical configuration and being mounted on and projecting generally perpendicularly outwardly from the nozzle support flange 60 adjacent to one end portion of the inner band flange 58, and a hole 66 formed in the one end portion of the inner band flange 58 for receiving the outer projecting portion of the mounting pin 64 in a tight fitting relation. The hole 66 has an oval, or racetrack, shape. The oval-shaped hole 66 has a greater height H than width W such that the height H is oriented radially with respect to the central axis 16 and a tight tangential fit of the pin 64 with the hole 66 is provided along the width W of the hole 66 and a loose fit of the pin 64 with the hole 66 is provided along the height H of the hole 66 so as to ensure negligible variation of the tangential location of the nozzle segments 46 relative to one another and to the support structure 54, while allowing free axial rocking of the nozzle segment 46 on the inner band chordal hinge 62 without bending the pin 64 nor the support flange 60. For instance, FIGS. 5–7 depict a first position of the mounting pin 64 relative to the oval-shaped hole 66 when the engine 10 is in a low power condition, whereas FIGS. 8–10 illustrate a second position of the mounting pin 64 relative to the oval-shaped hole 66 when the engine 10 is in a high power condition.

Thus, the tangential gas load on each nozzle segment 46 is carried through the single mounting pin 64 located in the oval-shaped hole 66 in the inner band flange 58. The axial gas load on each nozzle segment 46 is carried through the chordal hinge 62 on the inner band flange 58 and through the pads 68 at either end of an aft face of the outer band 50. Since the load is carried primarily at the ends of the flange 58, the middle portion of the flange 58 can be made thinner, thus saving weight. Also the thinner middle portion of the flange helps to reduce the effect of thermal bow since the nozzle support flattens this thin area. The tangential moment due to the gas load is reacted through overlapping portions 70 on the opposite ends of the inner bands 48 of adjacent nozzle segments 46 and through the reaction at the radial load stop 72.

In conclusion, the nozzle support arrangement 56 of the present invention as well as the other support features described above advantageously performs the following functions: (1) supports the axial and tangential gas load; (2) reacts the tangential moment due to the gas load; (3) minimizes bending of the inner nozzle support structure, while allowing the nozzle to tilt axially between the inner and outer bands; (4) minimizes tolerance stack-up to accurately position the nozzle axially and tangentially, directly affecting nozzle throat area and hence engine performance; (5) minimizes thermal contact area between the nozzle and inner nozzle support structure to keep the support flange temperature down; and (6) minimizes weight.

Turbine Nozzle Seal Arrangement

Figure 4:
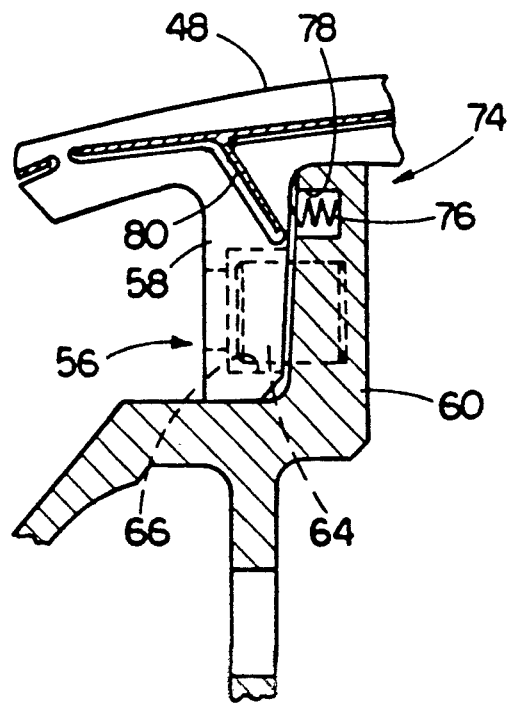
FIG. 4 is an enlarged view of area A of FIG. 3, showing the nozzle seal arrangement of the present invention and the nozzle support arrangement of the cross-referenced invention.

Referring to FIGS. 3 and 4, a nozzle seal arrangement, generally designated 74, of the present invention is provided between the inner band flanges 58 for sealing between the nozzle segments 46 and between the nozzle support flange 60 and the inner band flanges 58 of the nozzle segments 46. The nozzle seal arrangement 74 includes a continuous seal member 76 having an inverted W-shaped configuration in crosssection which extends circumferentially about the central axis 16. The nozzle seal arrangement 74 also includes an annular recess 78 defined in the forward face of the nozzle support flange 60 which extends circumferentially about the central axis 16 and receives and seats the seal member 76 at the aft side thereof. The forward side of the seal member 76 extends past the forward face of the nozzle support flange 60 and engages the aft face of the inner band flange 58. The seal member 76 is flexible enough to accommodate any bowing of the nozzle band flange 58 caused by thermal gradient from the aft to forward ends of the nozzle inner band 48. This W-shaped seal member 76 also provides a second seal in series with the seal provided by the chordal hinge 62, reducing leakage even when no bowing occurs.

The nozzle seal arrangement 74 also includes a plurality of L-shaped spline seal members 80 arranged between the end faces of the nozzle segments 46. These seal members 80 block the leakage path between the vertical and aft horizontal spline seal members which are also employed between the end faces of the nozzle segments 46.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. In a gas turbine engine having a longitudinal central axis, an annular casing disposed about said central axis and having an annular stationary support structure, an annular combustor for generating pressurized combustion gases, a high pressure turbine disposed rearwardly of said combustor for receiving the pressurized combustion gases and extracting energy from the gases, and an annular turbine nozzle having at least one stage disposed in said annular casing between said combustor and said high pressure turbine, said annular nozzle stage including a plurality of nozzle segments arranged in an end-to-end circumferential relationship about said central axis, each nozzle segment having a pair of inner and outer bands spaced from one another in radial relation to said central axis and defining a flow path for pressurized combustion gases from said combustor to said high pressure turbine, each nozzle segment also having at least one airfoil extending in radial relation to said central axis and mounted between said inner and outer bands across said flow path for the pressurized combustion gases, a nozzle seal arrangement for impeding leakage of high pressure cooling air past said nozzle inner bands into the flow path to the outside thereof, said nozzle seal arrangement comprising:

(a) an annular nozzle support flange attached to and extending along said stationary support structure adjacent to said nozzle;
    (b) a band flange attached to and extending along said inner band of each nozzle segment and disposed adjacent to said support flange;
    (c) a continuous flexible seal member extending circumferentially about said central axis; and
    (d) an annular recess defined in a forward face of said nozzle support flange and extending circumferentially about said central axis, said recess receiving and seating said seal member at an aft side thereof.

2. The nozzle seal arrangement as recited in claim 1, wherein said flexible seal member at a forward side thereof extends past a forward face of said nozzle support flange and engages an aft face of said inner band flange.

3. The nozzle seal arrangement as recited in claim 1, wherein said flexible seal member has a W-shaped cross-sectional configuration.

4. The nozzle seal arrangement as recited in claim 1, wherein said inner band flange having a chordal hinge cut on an aft face thereof which permits said nozzle segment to lean toward said combustor at said outer band of said nozzle segment without allowing a leakage path to open between said inner band flange and a flat face of said nozzle support flange.

5. The nozzle seal arrangement as recited in claim 1, further comprising:

a plurality of L-shaped spline seal members arranged between end faces of adjacent one of said nozzle segments for blocking leakage therebetween.

* * * * *